US010235365B2

United States Patent
Cherian

(10) Patent No.: US 10,235,365 B2
(45) Date of Patent: Mar. 19, 2019

(54) TRANSFORMING SPOKEN THOUGHTS TO A VISUAL REPRESENTATION

(71) Applicant: Microsoft Technology Licensing, LLC, Redmond, WA (US)

(72) Inventor: Lisa C. Cherian, Kirkland, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 0 days.

(21) Appl. No.: 15/628,161

(22) Filed: Jun. 20, 2017

(65) Prior Publication Data
US 2018/0365233 A1    Dec. 20, 2018

(51) Int. Cl.
| G06F 17/27 | (2006.01) |
| G06F 17/30 | (2006.01) |
| G10L 15/22 | (2006.01) |
| G10L 15/08 | (2006.01) |
| G06Q 10/10 | (2012.01) |
| H04L 29/08 | (2006.01) |
| G06F 17/28 | (2006.01) |

(52) U.S. Cl.
CPC ........ *G06F 17/289* (2013.01); *G06F 17/2836* (2013.01)

(58) Field of Classification Search
CPC ..... G10L 15/22; G10L 15/08; G06F 17/2785; G06F 17/30867; G06F 17/30286; G06F 243/0481; H04L 29/08072; G06Q 10/10; G06Q 10/107
See application file for complete search history.

(56) References Cited

U.S. PATENT DOCUMENTS 5,625,748 A * 4/1997 McDonough ....... G10L 15/1822
704/236
6,918,096 B2 * 7/2005 Hugh ................ G06F 17/30994
707/E17.142

(Continued)

FOREIGN PATENT DOCUMENTS

WO    2016049631 A1    3/2016

OTHER PUBLICATIONS

YouTube Inspiration 9 video: https://www.youtube.com/watch?v=R2z0eRgqlLw, uploaded Mar. 5, 2010.*

(Continued)

*Primary Examiner* — Anne L Thomas-Homescu
(74) *Attorney, Agent, or Firm* — Talem IP Law, LLP

(57) ABSTRACT

Applications and services are disclosed for transforming spoken thoughts to a visual representation of related topics found in the spoken thoughts. Transforming the spoken thoughts can include receiving audio input of a spoken thought of a user and converting the audio input to text of the spoken thought. The system can identify a plurality of topics from the text using word frequency, and can create a topic graph for the plurality of topics by determining relationships between topics of the plurality of topics, and assigning a weight to each of the plurality of topics based at least on the determined relationships. The system can generate a visual display of the topic graph for the plurality of topics by representing relevant topics of the plurality of topics using topic shapes, which can be connected by the determined relationships and sized by the assigned weight.

19 Claims, 8 Drawing Sheets

(56) References Cited

U.S. PATENT DOCUMENTS

| | | | |
|---|---|---|---|
| 8,954,431 B2 | 2/2015 | Okazaki et al. | |
| 9,665,570 B2* | 5/2017 | Chee | G06F 17/28 |
| 2007/0255747 A1* | 11/2007 | Lee | G06F 17/30038 |
| 2009/0119584 A1* | 5/2009 | Herbst | G06F 17/30731 |
| | | | 715/273 |
| 2010/0030552 A1* | 4/2010 | Chen | G06F 17/27 |
| | | | 704/9 |
| 2011/0270609 A1 | 11/2011 | Jones et al. | |
| 2011/0282919 A1* | 11/2011 | Sweeney | G06F 17/30365 |
| | | | 707/805 |
| 2012/0317108 A1* | 12/2012 | Okazaki | G06F 3/048 |
| | | | 707/732 |
| 2013/0021346 A1* | 1/2013 | Terman | G09B 5/08 |
| | | | 345/467 |
| 2013/0275527 A1* | 10/2013 | Deurloo | H04L 51/32 |
| | | | 709/206 |
| 2014/0310329 A1* | 10/2014 | Jones | H04L 67/306 |
| | | | 709/201 |
| 2014/0337436 A1* | 11/2014 | Hoagland | G06F 17/30867 |
| | | | 709/204 |
| 2015/0106078 A1 | 4/2015 | Chang | |
| 2015/0106081 A1* | 4/2015 | Chee | G06F 17/279 |
| | | | 704/9 |
| 2015/0142888 A1* | 5/2015 | Browning | H04L 12/1831 |
| | | | 709/204 |
| 2016/0034757 A1* | 2/2016 | Chhichhia | G06K 9/00469 |
| 2016/0038049 A1* | 2/2016 | Geva | A61B 5/048 |
| | | | 600/544 |
| 2016/0103932 A1* | 4/2016 | Sathish | G06F 17/30705 |
| | | | 715/767 |
| 2017/0124174 A1* | 5/2017 | Starr | G06F 17/30598 |
| 2017/0140118 A1* | 5/2017 | Haddad | G06F 19/3406 |
| 2017/0228445 A1* | 8/2017 | Chiu | G06F 17/30557 |
| 2017/0242921 A1* | 8/2017 | Rota | G06F 17/30625 |
| 2017/0308399 A1* | 10/2017 | Wardell | G06F 9/5027 |
| 2017/0330357 A1* | 11/2017 | Siegel | G06T 11/206 |
| 2018/0018316 A1* | 1/2018 | Bogdan | G06F 17/2715 |

OTHER PUBLICATIONS https://mindmappingsoftwareblog.com/using-speech-recognition-and-mind-mapping-software-together/, "Using speech recognition and mind mapping software together", Jan. 8, 2007.* https://zapier.com/blog/mind-mapping-tutorial/, "How to Make Mind Maps: Visualize Your Ideas for Better Brainstorming", Aug. 30, 2016.*

"Voice-control for mind mapping software", http://www.engineerlive.com/content/21239, Published on: Feb. 21, 2013, 1 page.

"Inspiration 9", http://www.inspiration.com/Inspiration, Retrieved on: May 17, 2017, 4 pages.

"MindMup 2", https://www.mindmup.com/, Retrieved on: May 17, 2017, 6 pages.

"Canva", https://www.canva.com/graphs/mind-maps/, Retrieved on: May 17, 2017, 11 pages.

"Bubbl.us", https://bubbl.us/, Retrieved Date: May 17, 2017, 4 pages.

Gileva, Olesya, "Prepare for Public Speaking in 10 Minutes with ConceptDraw MINDMAP", http://www.conceptdraw.com/csnews_online/3/10minutes_mindmap.php, Published on: Oct. 2009, 3 pages.

"Advanced search and filter", https://support.mindmeister.com/hc/en-us/articles/218569307-Advanced-search-and-filter, Retrieved on: May 17, 2017, 3 pages.

"Visual Thesaurus", https://www.visualthesaurus.com/app/view, Retrieved on: May 22, 2017, 1 page.

"Write Ideas", https://www.microsoft.com/en-us/garage/workbench-apps-details/Write_Ideas/index.html, Retrieved on: May 22, 2017, 4 pages.

"International Search Report and Written Opinion Issued in PCT Application No. PCT/US18/033996", dated, Oct. 31, 2018, 11 Pages.

* cited by examiner

TRANSFORMING SPOKEN THOUGHTS TO A VISUAL REPRESENTATION

BACKGROUND

Brainstorming refers to a method a person can use to generate ideas for creating content, such as writing a paper. During a brainstorming session, a person writes all their thoughts onto paper without worrying about how they fit together.

However, brainstorming can be a difficult process for people with certain disabilities, such as dysgraphia and dyslexia. Dysgraphia refers to a deficiency in the ability to write; and dyslexia refers to a reading disorder that is characterized by trouble with reading despite having normal intelligence. Some people who have dysgraphia and dyslexia have ideas, but have a hard time getting them out of their head and onto paper, as well as organizing them into key topics. They may find it more natural to speak their thoughts out loud. The writing of organized thoughts on paper is a barrier for them that stops them from being able to express themselves easily.

BRIEF SUMMARY

Applications and services are disclosed for transforming spoken thoughts to a visual representation of related topics found in the spoken thoughts.

Transforming spoken thoughts to a visual representation of related topics found in the spoken thoughts can include receiving audio input of a spoken thought of a user and converting the audio input to text of the spoken thoughts. Then, the system can identify a plurality of topics from the text using word frequency, and can create a topic graph for the plurality of topics by determining relationships between topics of the plurality of topics, and assigning a weight to each of the plurality of topics based at least on the determined relationships. The system can then generate a visual display of the topic graph for the plurality of topics by representing relevant ones of the plurality of topics using topic shapes. The topic shapes are connected by the determined relationships and sized by the assigned weight. In some cases, the system can assign an outline parameter to each of the topic shapes based on the size of the topic shape and the determined relationships, and generate an outline based on the outline parameters.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
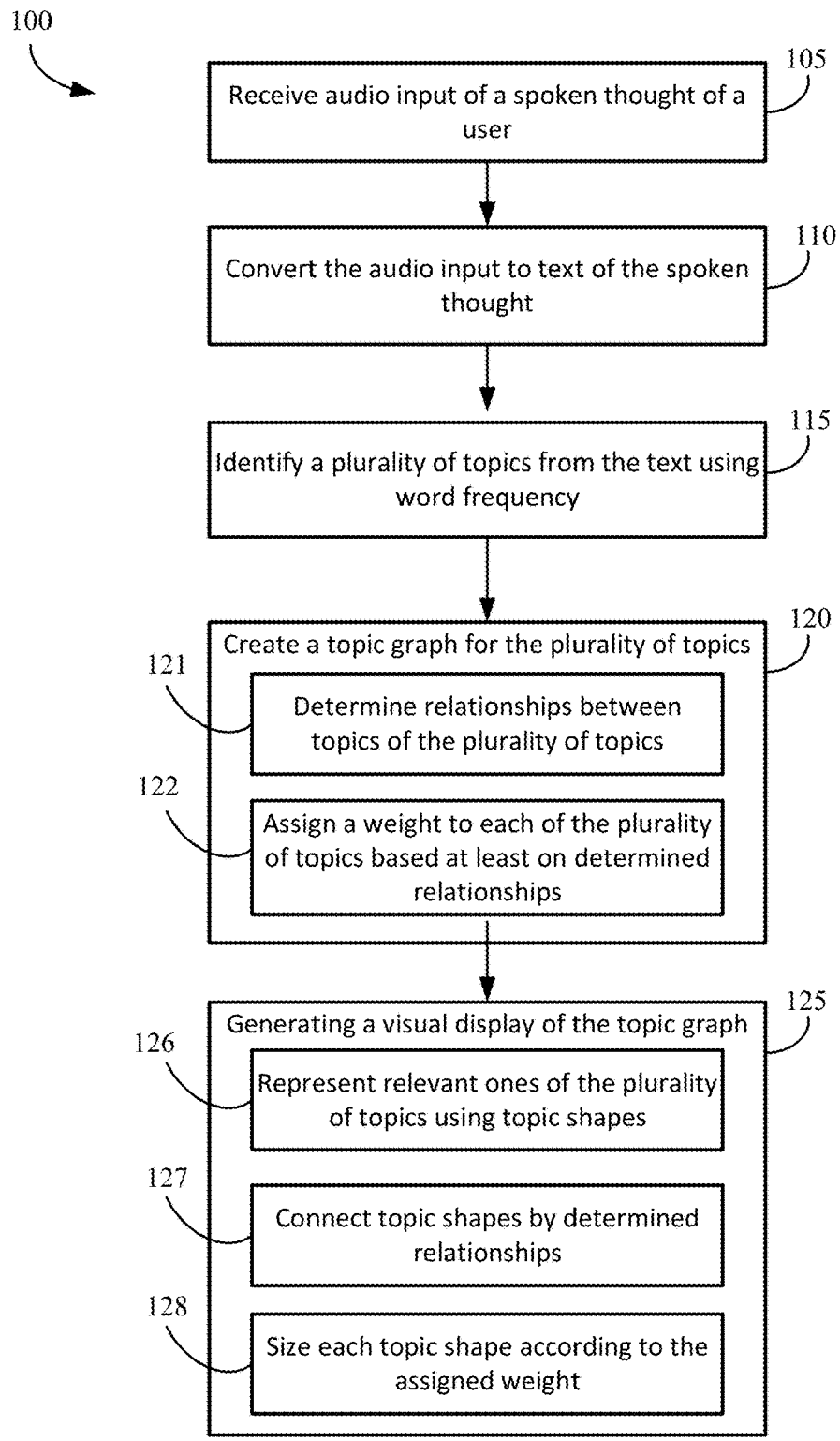
FIG. 1 illustrates an example process for transforming spoken thoughts to a visual representation of related topics found in the spoken thoughts.

Applications and services are disclosed for transforming spoken thoughts to a visual representation of related topics found in the spoken thoughts.

Although reference is made to an "application," it should be understood that the application can have varying scope of functionality. That is, the application can be a stand-alone application or an add-in or feature of another product. The application may be local or provided online or as a service.

A topic is a word or a distribution of words and can correspond to an aspect of an entity or the entity itself. An entity may refer to a person, place, thing, event, task, or concept. A topic serves as a subject or category of related information. The topic of an expression (e.g., a sentence, clause, or fragment) can be used for entity disambiguation (e.g., using Latent Dirichlet Allocation (LDA) and its hierarchical variants). Entity disambiguation refers to the identifying of entities from text and their labeling with one of several entity-type labels. In some cases, Wikipedia may be used as a comprehensive reference catalog for large-scale entity disambiguation. In other cases, other public and/or private corpus can be used to facilitate the entity disambiguation.

Entities may be identified from the user's spoken thoughts and used as relevant topics and/or used to determine relevant topics.

Transforming spoken thoughts to a visual representation of related topics found in the spoken thoughts can include receiving audio input of a spoken thought of a user and converting the audio input to text of the spoken thought. Then, the system can identify a plurality of topics from the text using word frequency, and can create a topic graph for the plurality of topics by determining relationships between topics of the plurality of topics and entities, and assigning a weight to each of the plurality of topics based at least on the determined relationships. The system can then generate a visual display of the topic graph for the plurality of topics by representing relevant ones of the plurality of topics using topic shapes. The topic shapes are connected by the determined relationships and sized by the assigned weight. In some cases, the system can assign an outline parameter to each of the topic shapes based on the size of the topic shape and the determined relationships. The outline parameter denotes an organizational level of an outline, such as heading or subheading. The system can then generate an outline based on the outline parameters.

The disclosed applications and services allow a user to speak into a computing device while the system creates a structure (a visual display of a topic graph) for the user based on the ideas they have discussed in freeform verbal language. Advantageously, this helps people use a verbal "speak aloud" approach to gathering ideas. This is especially helpful for people who are more comfortable thinking their ideas out loud rather than typing or writing them.

As the user talks, the system creates a visual display of a topic graph based on the ideas the user spoke into the system. The topic graph can be generated solely from the audio input of the user and does not require the user to directly input a main topic to the system. Advantageously, the system can determine the main topic, as well as subtopics from the audio input received from the user.

FIG. 1 illustrates an example process for transforming spoken thoughts to a visual representation of related topics found in the spoken thoughts. Referring to FIG. 1, a computing device performing process 100 can be embodied, for example, as system 400 described with respect to FIG. 4, and may be used to access an application, such as a spoken thought transformation application ("transformation application") and a wide range of services, such as a speech-to-text service, over a network.

The user computing device can be, but is not limited to, a personal computer (e.g. desktop computer), laptop, personal digital assistant (PDA), video game device, mobile phone (or smart phone), tablet, slate, terminal, wearable, and the like. It should be apparent that the user computing device may be any type of computer system that provides its user the ability to load and execute software programs and the ability to input audio, and may be embodied as described with respect to system 400.

The transformation application can be stored on the user computing device (e.g., a client-side application) or accessed as a web-based transformation application (e.g., running on a server or hosted on a cloud) using a web browser (e.g., a standard internet browser), and the application's interface may be displayed to the user within the web browser. Thus, the application may be a client-side application and/or a non-client side (e.g., a web-based) application. In some cases, the transformation application may be a feature of an application, such as a content creation application.

Communication to and from the computing device may be carried out, in some cases, via application programming interfaces (APIs). An API is an interface implemented by a program code component or hardware component (hereinafter "API-implementing component") that allows a different program code component or hardware component (hereinafter "API-calling component") to access and use one or more functions, methods, procedures, data structures, classes, and/or other services provided by the API-implementing component. An API can define one or more parameters that are passed between the API-calling component and the API-implementing component. The API is generally a set of programming instructions and standards for enabling two or more applications to communicate with each other and is commonly implemented over the Internet as a set of Hypertext Transfer Protocol (HTTP) request messages and a specified format or structure for response messages according to a REST (Representational state transfer) or SOAP (Simple Object Access Protocol) architecture.

The network may be, but is not limited to, a cellular (e.g., wireless phone) network, the Internet, a local area network (LAN), a wide area network (WAN), a WiFi network, or a combination thereof. Such networks may involve connections of network elements, such as hubs, bridges, routers, switches, servers, and gateways. For example, the network may include one or more connected networks (e.g., a multi-network environment) including public networks, such as the Internet, and/or private networks such as a secure enterprise private network. Access to the network may be provided via one or more wired or wireless access networks (not shown), as will be understood by those skilled in the art. As will also be appreciated by those skilled in the art, communication networks can take several different forms and can use several different communication protocols.

To begin process 100, the system can receive audio input of a spoken thought of a user (105). A user may interact with the computing device running the thought transformation application or a content creation application with a spoken thought transformation feature, through a user interface (UI) to enter the audio input.

The computing device is configured to receive input from a user through, for example, a keyboard, mouse, trackpad, touch pad, touch screen, microphone, camera, eye gaze tracker, or other input device. The UI enables a user to interact with various applications, such as the transformation application, running on or displayed through the user computing device. Generally, the UI is configured such that a user may easily interact with the functionality of an application. For example, the user may speak into a microphone of the computing device while discussing ideas (entities) for content creation.

Through the transformation application, the user may be able to generate a visual representation of their spoken thoughts without having to perform a non-verbal interaction with the computing device. Indeed, the transformation application does not require user interaction with, for example, a keyboard, mouse, trackpad, touch pad, or touch screen. The system allows the user to use a verbal "speak aloud" approach to generate ideas.

The system can then convert the audio input to text of the spoken thought (110). In some cases, the system can dynamically convert the audio input to text as the user is speaking. In other cases, the system can convert the audio input to text after the user has finished speaking. The system can convert the audio input to text locally or send the audio input to a speech-to-text service to be converted.

Through the speech-to-text conversion, one or more collections of words and entities are obtained and an analysis may be performed on every collection or each collection separately. The conversion allows the system to analyze the text to generate a visual display of a topic graph, as will be discussed in more detail.

The system can perform operations 115, 120, and 125 automatically upon receipt of a unit of text from the speech-to-text conversion operation. The unit of text may be based on any suitable factor. No interpretation or parsing for commands in the text are required.

Once the audio input has been converted to text of the spoken thought (110), the system can identify a plurality of topics using word frequency (115). The system can then create a topic graph for the plurality of topics (120) by, for example, determining relationships between topics of the plurality of topics (121), and assign a weight to each of the plurality of topics based at least on the determined relationships (122).

The system can then generate a visual display of the topic graph for the plurality of topics (125) by, for example, representing relevant ones of the plurality of topics using topic shapes (126). The topic shapes can be connected by the determined relationships (127) and sized by the assigned weights (128).

The plurality of topics may be key topics and entities identified from the entities discussed in the spoken thoughts of the user. The plurality of topics may be identified by looking at how often certain words are used throughout the text. The system does not need to look at the word frequency of words that are superfluous or commonly used when speaking, such as "the", "of", "and", "a", and "it". To identify the plurality of topics, the words may be given a weight based on the word frequency. Then, the words with a weight above a weight threshold can be identified as the topics.

In some cases, the system may define a rating system for the words included in the text to identify the plurality of topics. For example, the words with the highest rating may be identified as the topics.

In some cases, the system may assign weights to certain types of words to make them more related to other words. The system may use the word frequency and identified related words to form clusters of words. For example, the words (e.g., the entities) in the text are related to each other around certain subject areas. Therefore, these clusters may define larger concepts and subject areas within the plurality of topics.

When the system has identified the plurality of topics, the system can determine connections between each topic, as well as the importance of each topic. The connections between the topics are based on the determined relationships and the importance of each topic is defined by the assigned weight.

The relationships between the plurality of topics can be determined a variety of ways. For example, the system may identify relationships of topics by analyzing the links between descriptions of the topics. The relationships between the plurality of topics can identify the connection between each of the plurality of topics and can be used to further analyze the text.

Based on the determined relationships of the plurality of topics, the system can assign a weight to each topic. The assigned weights can identify the importance of the topic. For example, the higher the weight assigned to a topic, the more important the topic. The system can identify, for example, the main topic of the spoken thoughts, as well as sub-topics. The system can identify the main topic by analyzing how many different topics relate to a single topic and assigning a weight to the topic. The highest weighted topic can be identified as the main topic. Advantageously, the described invention provides a way for a user to use their natural way of thinking (out loud) to get insights into their ideas and unlock creativity. The system can identify the main topic of the spoken thoughts of the user, as well as related topics, without the user directly providing the main idea to the system.

In some cases, the system can determine how much time is spent explaining or describing a topic in the audio input. The system can use this information to help assign the weight to each topic. For example, the more time spent explaining the topic, the more important the topic, and thus, a higher assigned weight.

Through determining the relationship of the topics and assigning the weights, the system can recognize a hierarchy of the topics. The hierarchy can be a factor used in identifying the most important topics.

Each of the topics of the topic graph can be represented by a topic shape. The topic shape may include a wide range of shapes, such as but not limited to, a bubble, a circle, a square, and a rectangle. The topic shapes are connected by the determined relationships and sized by the assigned weights. For example, if there is a determined relationship between two topics, then the topic shapes of the two topics will be connected. The topic shapes can be connected by, for example, a line or any other connector.

The size of the topic shapes can be determined by the assigned weights. For example, the largest topic shape can include the highest weighted topic. In this case, the largest topic shape would include the most important topic.

In some cases, the plurality of topics may not be represented by a topic shape. In this case, the topic graph may include the word(s) of the topic. Like the topic shapes, the word(s) may be connected based on the determined relationships and sized based on the assigned weights.

The visual display of the topic graph can be dynamically generated. The system may dynamically generate the visual display of the topic graph as the user is speaking. Therefore, the topic graph may grow and change as the user is speaking. For example, the user may begin to input audio by speaking about less important topics. As the user speaks, these less important topics will be included in the visual display of the topic graph. Then, as the user spends more time talking about more important topics, the visual display of the topic graph can change to show the more important topics as larger topic shapes than the less important topics. In some cases, one or more topic shapes that represent a less important topic may be removed from the visual display of the topic graph.

In some cases, the visual display of the topic graph can be generated after the user is done speaking. In this case, the system can analyze all the converted text and output a complete visual display of the topic graph. The user may choose to include additional audio input after the visual display of the topic graph has been generated. In this case, the visual display of the topic graph may change based on the additional audio input.

In one example, as the user starts to input audio, a few topics may be displayed. The topics that are displayed may be represented by topic shapes or may be displayed without a topic shape. For example, the system may display all the words the user is speaking or may display only identified topics without generating a topic graph. As the user keeps talking, the system may determine the relationships and assign weights to the topics and dynamically generate the visual display of the topic graph.

In some cases, alternatively or in addition to the visual representation of the topic graph, an outline may be generated and displayed based on the topic graph. The outline may be generated in a variety of ways. For example, the system may provide an identifier or outline parameter for each of the plurality of topics. The identifier or outline parameter may include a number, a label, or the like. In some cases, the system may use the assigned weights as the identifier or outline parameter. For example, the system may assign a number to each topic based on the determined hierarchy. The topic with the highest number can be the most important topic and thus the main topic of the outline. Then, the topics with numbers lower than the main topic can become the sub-topics.

The generated outline can be generated based on the rules of outlining. For example, the generated outline may display information related to a topic sentence, a main idea, a paragraph summary, a paragraph explaining a first sub-topic, a paragraph explaining a second sub-topic, a conclusion paragraph, and a closing sentence. The generated outline may be ported to a document, for example, in a content creation application.

Figure 2:
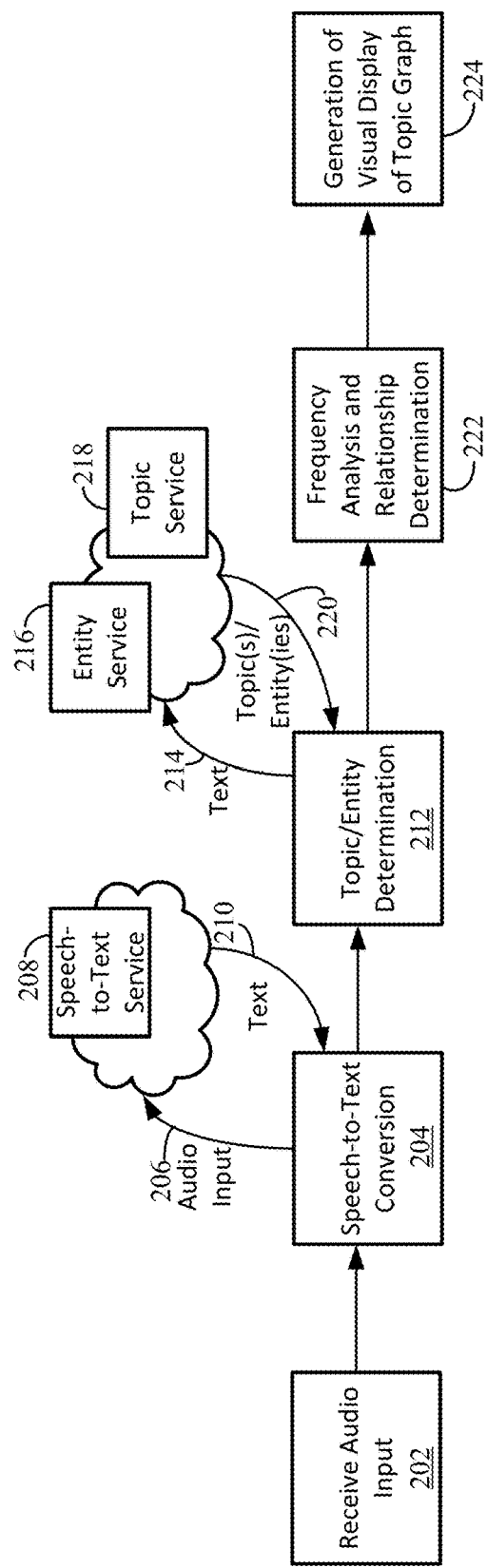
FIG. 2 illustrates an example process for transforming spoken thoughts to a visual representation of related topics found in the spoken thoughts.

FIG. 2 illustrates an example process for transforming spoken thoughts to a visual representation of related topics and entities found in the spoken thoughts. Referring to FIG. 2, a computing device performing a process for transforming spoken thoughts to a visual representation of related topics, such as process 100 described with respect to FIG. 1, can be embodied, for example, as system 400 described with respect to FIG. 4, and may be used to access an application, such as a spoken thought transformation application ("transformation application") and a wide range of services, such as a speech-to-text service, over a network.

The process can start at block 202, where the system can receive audio input from a user. The audio input can be the spoken thoughts of a user. At block 204, the audio input can be converted to text. In some cases, the audio input is sent (206) to a speech-to-text service, such as speech-to-text service 208. In some cases, the system sends the audio input to the speech-to-text service 208 after the user has completed speaking. In other cases, the system sends the audio input to the speech-to-text service 208 in multiple units, as the user is speaking. The speech-to-text service 208 converts the audio input to text and sends (210) the converted text back to the system. The speech to text service 208 could be, but is not limited to being, from a dictation application or a translation application such as BING translate.

At block 212, a plurality of topics and entities can be determined. In some cases, the system sends (214) the converted text to an entity service 216 and/or a topic service 218. The entity service 216 and the topic service 218 may be separate services or the same service. The entity service 216 can perform an entity analysis to identify one or more entities from the converted text and the topic service 218 can perform a topic analysis to identify one or more topics from the converted text. The entity service 216 and/or the topic service 218 can then send (220) the topic(s) and entity(ies) back to the system. The entity service 216 and/or the topic service 218 can send one or more packages containing information about the identified topics and entities. The information can include the identified entities and identified topics that the entities relate to, as well as groups of text that are associated with the identified topics and entities. In some cases, the package will contain an identified topic, one or more entities that relate to that topic, and a grouping of the text that is associated with the topic and the one or more entities. In some cases, a topic can have multiple entities related to the topic.

Once the system has received the identified topics and entities, the system can locally perform a frequency analysis and a relationship determination at block 222. The frequency analysis and relationship determination may be performed by any of the methods previously described. In some cases, the system can assign a weight to each of the identified topics, as well as a topic shape parameter. In some cases, as the system receives more topic and entity information, the assigned weights may change. The topic shape parameter may be associated with the assigned weight. The topic shape parameter can define the size a topic shape representing each relevant topic and entity. The larger the assigned weight, the larger the topic shape parameter, and thus, the larger the size of the topic shape.

In some cases, determining the relationships between the topics includes grouping the converted text into groupings of text associated with each of the topics. Then, the system can determine relationships between each of the groupings of text. The relationships could be determined by, for example, analyzing the groupings of text for related words.

In some cases, weights may be assigned to each of the topics by grouping the converted text into groupings of text associated with each of the topics and then determining a word count for each of the groupings of text, as well as a total word count for all the converted text. Then, the system can determine a percentage of text in each of groupings compared to the total amount of text. The higher the percentage, the higher the assigned weight.

At block 224, the system can use the results from the frequency analysis and relationship determination to create a topic graph for the topics. The system can also generate a visual display of the created topic graph for the topics and entities by representing each of the relevant topics using the topic shape. The topic shapes can be connected by the determined relationships and sized by the assigned weight.

In some cases, the system can assign an outline parameter to each of the topic shapes based on the size of the topic shape and determined relationships. The outline parameter will determine if the topic shape is a main topic/heading or sub-topic/sub-heading. The system can generate an outline based on the outline parameters.

Figure 3A:
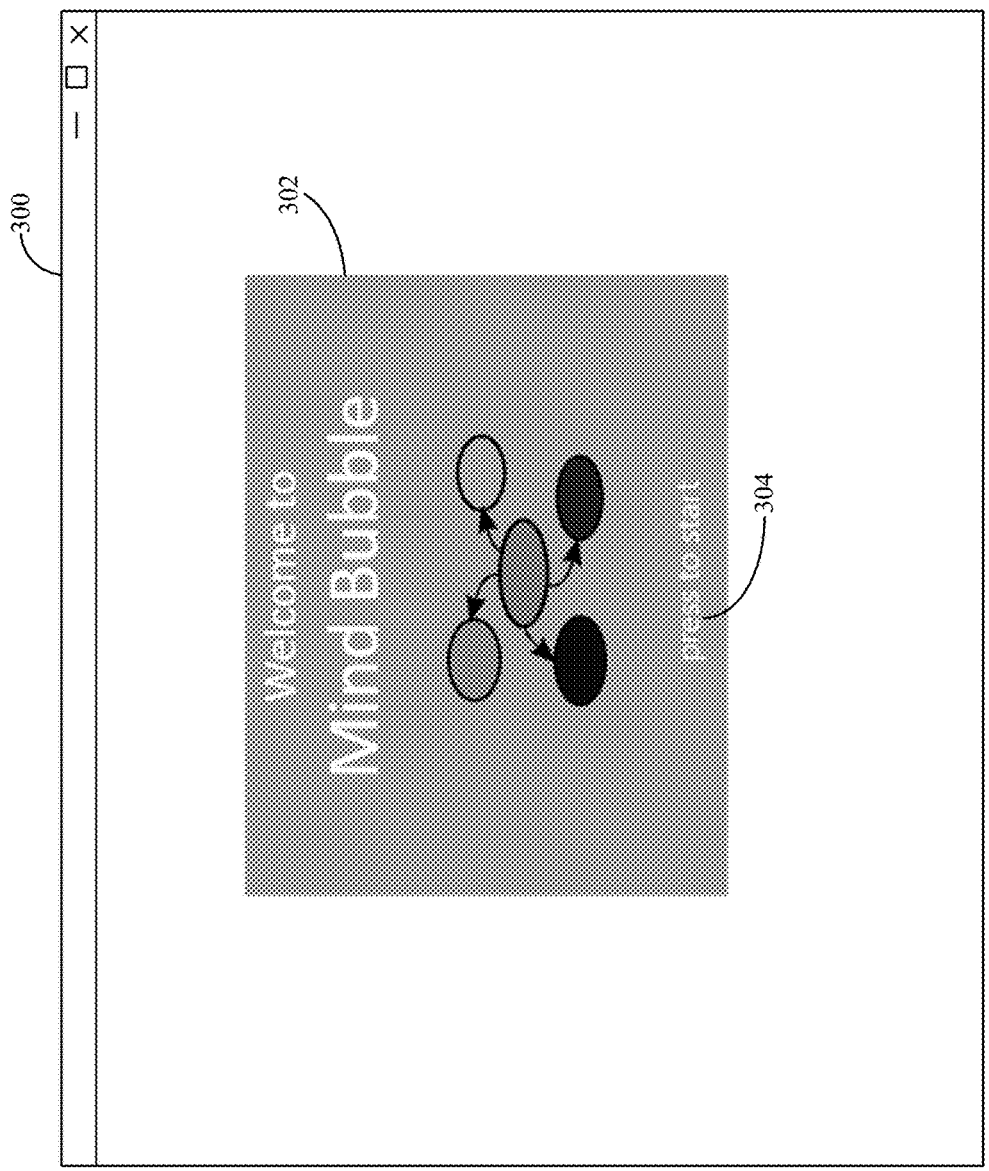
FIGS. 3A-3E illustrate some examples scenarios of transforming spoken thoughts to a visual representation of related topics found in the spoken thoughts.

FIGS. 3A-3E illustrate some examples scenarios of transforming spoken thoughts to a visual representation of related topics found in the spoken thoughts. Referring to FIG. 3A, a user may open an application, such as transformation application 300 on their computing device (embodied for example as system 400 described with respect to FIG. 4). The computing device can be any computing device such as, but not limited to, a laptop computer, a desktop computer, a tablet, a personal digital assistant, a smart phone, a smart television, a gaming console, wearable device, and the like.

Once the user has opened the transformation application 300, the user may be presented with a welcome page, such as welcome page 302. In this example, the transformation application 300 is named "Mind Bubbles". To start the process of transforming the spoken thoughts to the visual display, the user may select a start command on the welcome page 302, such as start command 304. The user may select the start command in a variety of ways. For example, the user may tap the start command 302 using a finger or a stylus, click the start command 302 using a mouse, or say the word "start." After the user has selected the start command 302, the user may then start speaking thoughts out loud.

Figure 3B:
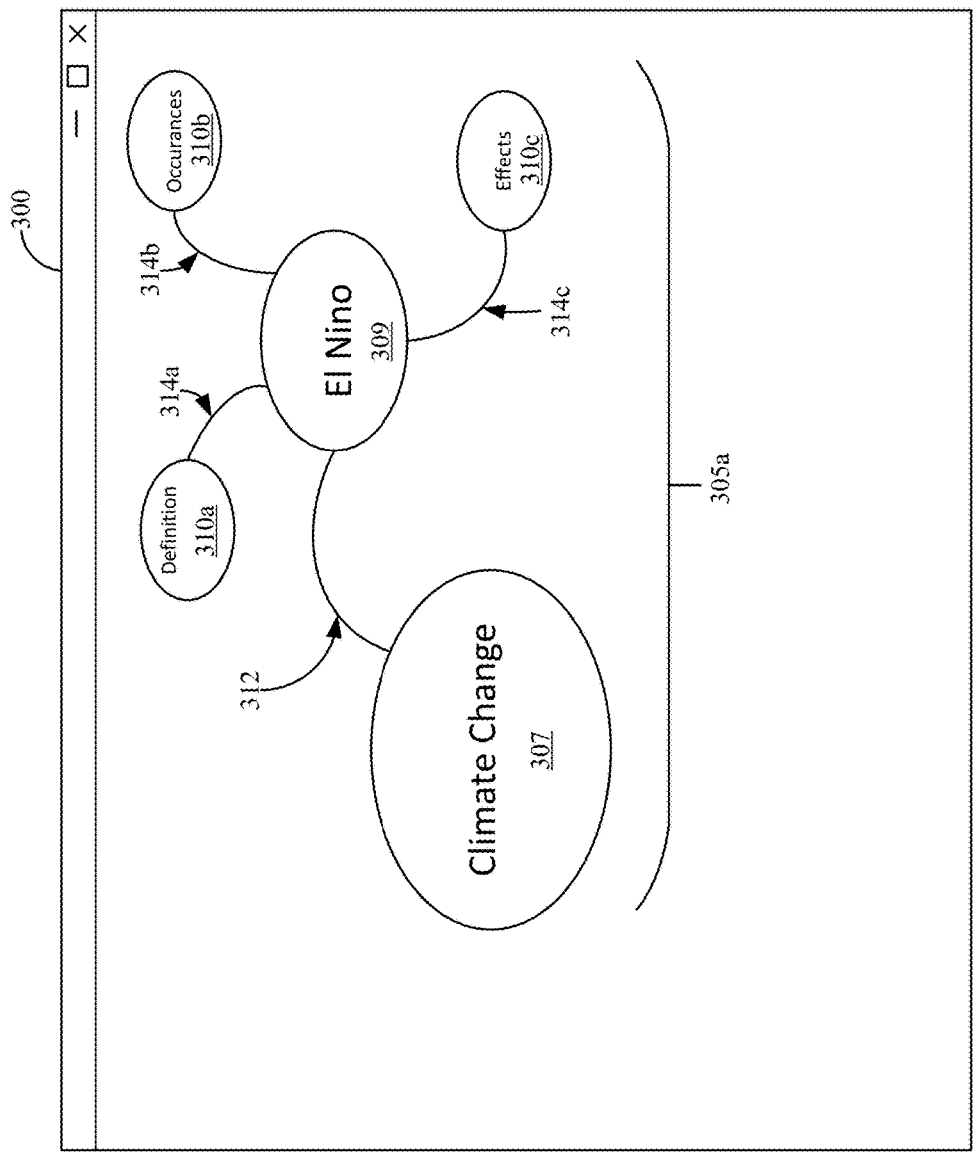

Referring to FIG. 3B, as the user starts speaking thoughts out loud, the application 300 can convert the spoken thoughts (audio input) to text, either locally or via a speech-to-text service. Then, through any of the previously discussed methods, the application 300 can generate a visual display of a topic graph. For example, the user may be writing a paper on climate change. In this case, the user may start to think out loud about what to include in the paper. The spoken thoughts may include, for example, what climate change is, when climate change began, and the factors of climate change. The user may then start speaking about El Nino. For example, the user may speak about what El Nino is, when El Nino has occurred, and what the effects of El Nino are. The system can identify a plurality of topics from the text. In this example, the topics may include, for example, climate change and El Nino.

As the user speaks, the application 300 generates a visual display of a topic graph 305. The topic graph 305a includes several topic shapes (e.g., main topic shape 307 and sub-topic shape 309, and sub-topic shapes 310a-310c) to represent each identified topic. Main topic shape 307 represents the topic "Climate Change" and is the most important and the largest topic. Thus, "Climate Change" is the main topic. Sub-topic shape 309 represents the topic "El Nino" and is a medium sized topic shape. Sub-topic shape 309 is connected to main topic shape 307 by connector line 312. Thus, El Nino is related to and is a sub-topic of the main topic, Climate Change. Sub-topic shape 310a, sub-topic shape 310b, and sub-topic shape 310c are all sub-topics related to sub-topic shape 309 and are connected to sub-topic shape 309 by connector line 314. Sub-topic shape 310a represents the topic "Definition," is connected to sub-topic 309 by connector line 314a, and refers to the spoken thought of what the definition of El Nino is. Sub-topic shape 310b represents the topic "Occurrences," is connected to sub-topic 309 by connector line 314b, and refers to the spoken thought of when El Nino has occurred. Sub-topic shape 310c represents the topic "Effects," is connected to sub-topic 309 by connector line 314a, and refers to the spoken thought of what the effects of El Nino are. Each topic shape of topic graph 305a has only one relationship, which is defined by the one connector line connecting each topic shape.

Figure 3C:
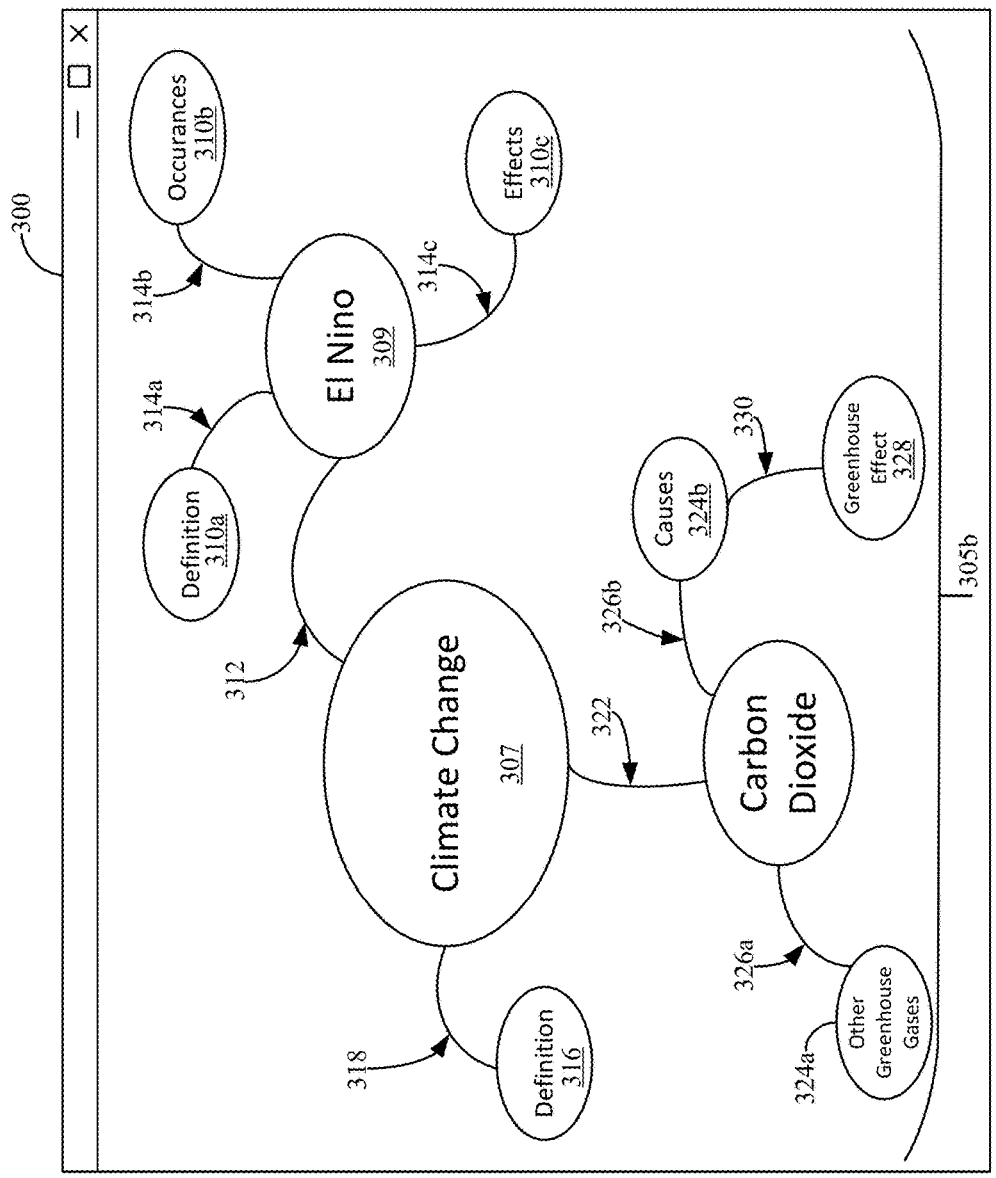

Referring to FIG. 3C, as the user continues to speak, the topic graph 305a dynamically changes and continues to grow into topic graph 305b. For example, the user may continue to speak about the definition of climate change. Therefore, the application 300 can identify that the definition of climate change is a sub-topic related to the main topic "Climate Change" 307. The application 300 then displays sub-topic shape 316, which represents the topic "Definition," with a connector line 318 showing the relationship to the main topic 307.

The user may also include spoken thoughts about how carbon dioxide relates to climate change. For example, the user may discuss what causes carbon dioxide, what the greenhouse effect is, and what other gases are included as a greenhouse gas. As the user is discussing these spoken thoughts, the application 300 may identify topics from the text of the spoken thoughts. In this example, the topics include carbon dioxide, causes of carbon dioxide, the greenhouse effect, and other greenhouse effects.

The application 300 may dynamically update the topic graph 305b to include the visual representation of the identified topics. For example, the application 300 may identify the topic "carbon dioxide" as a more important topic related to the main topic 307. Thus, the application 300 will size the topic shape for carbon dioxide, such as sub-topic shape 320, with a larger topic shape than the less important identified topics, such as causes of carbon dioxide, the greenhouse effect, and other greenhouse effects. The topic graph 305b shows the sub-topic shape 320 with a relationship to the main topic shape 307 through connector line 322.

In this case, the application 300 identifies the rest of the identified topics as having the same importance. Therefore, the application 300 represents each one with the same size topic shape. Sub-topic shape 324a represents the topic "Other Greenhouse Gases" and is connected to sub-topic 320 by connector line 326a. Sub-topic shape 324b represents the topic "Causes" and is connected to sub-topic 320 by connector line 326b. Further, the application 300 has identified the topic "Greenhouse Effect" as being related to the topic "Causes." Therefore, sub-topic shape 328 represents the topic "Greenhouse Effect" and is connected to sub-topic 324b by connector line 330.

Figure 3D:
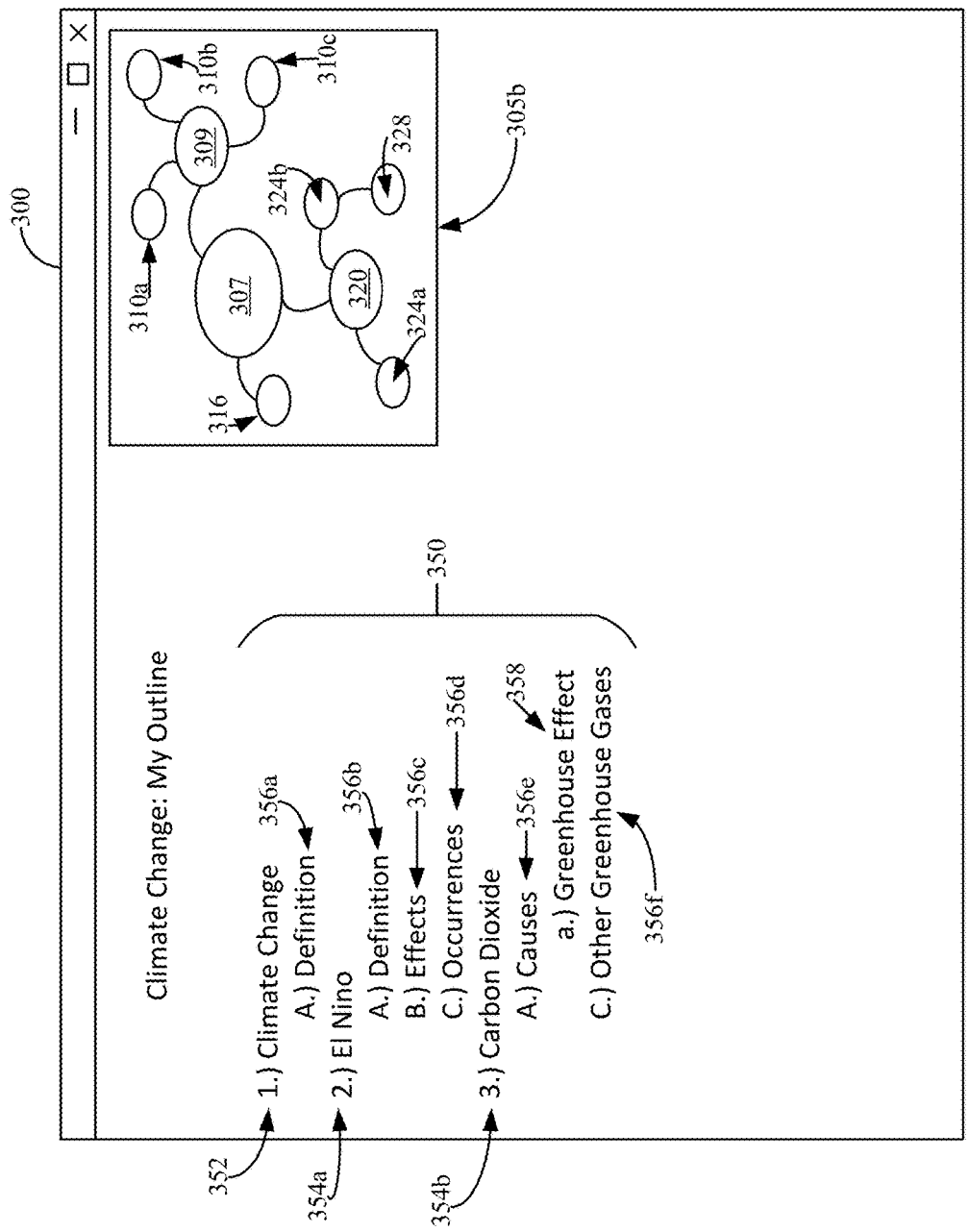

Referring to FIG. 3D, once the application 300 has generated the visual display of the topic graph 305b, the user may choose to have the application 300 generate an outline (such as outline 350) based on the topic graph 305b. In this example, the topic graph 305b is displayed along with the outline 350. In some cases, the outline 350 may be displayed without the topic graph 305b. The user may then edit the outline 350 to add additional information.

As previously discussed, the outline 350 may be generated based on the general outline rules. In this case, a main topic 352 is based on the main topic shape 307. Sub-topic I 354a and sub-topic II 354b are based on the sub-topic shape 309 and the sub-topic shape 320, respectively. The remaining topics are used to further describe the main topic 352, sub-topic I 354a, and sub-topic II 354b. Concept 356a, describing the main topic 352, is based on sub-topic shape 316. Concept 356b, concept 356c, and concept 356d, describing the sub-topic I 354a, are based on sub-topic shape 310a, sub-topic shape 310b, and sub-topic shape 310c, respectively. Concept 356e, and concept 356f, describing the sub-topic II 354b, are based on sub-topic shape 324a, and sub-topic shape 324b, respectively. Further, concept 358, describing concept 356e, is based on sub-topic shape 328.

Figure 3E:
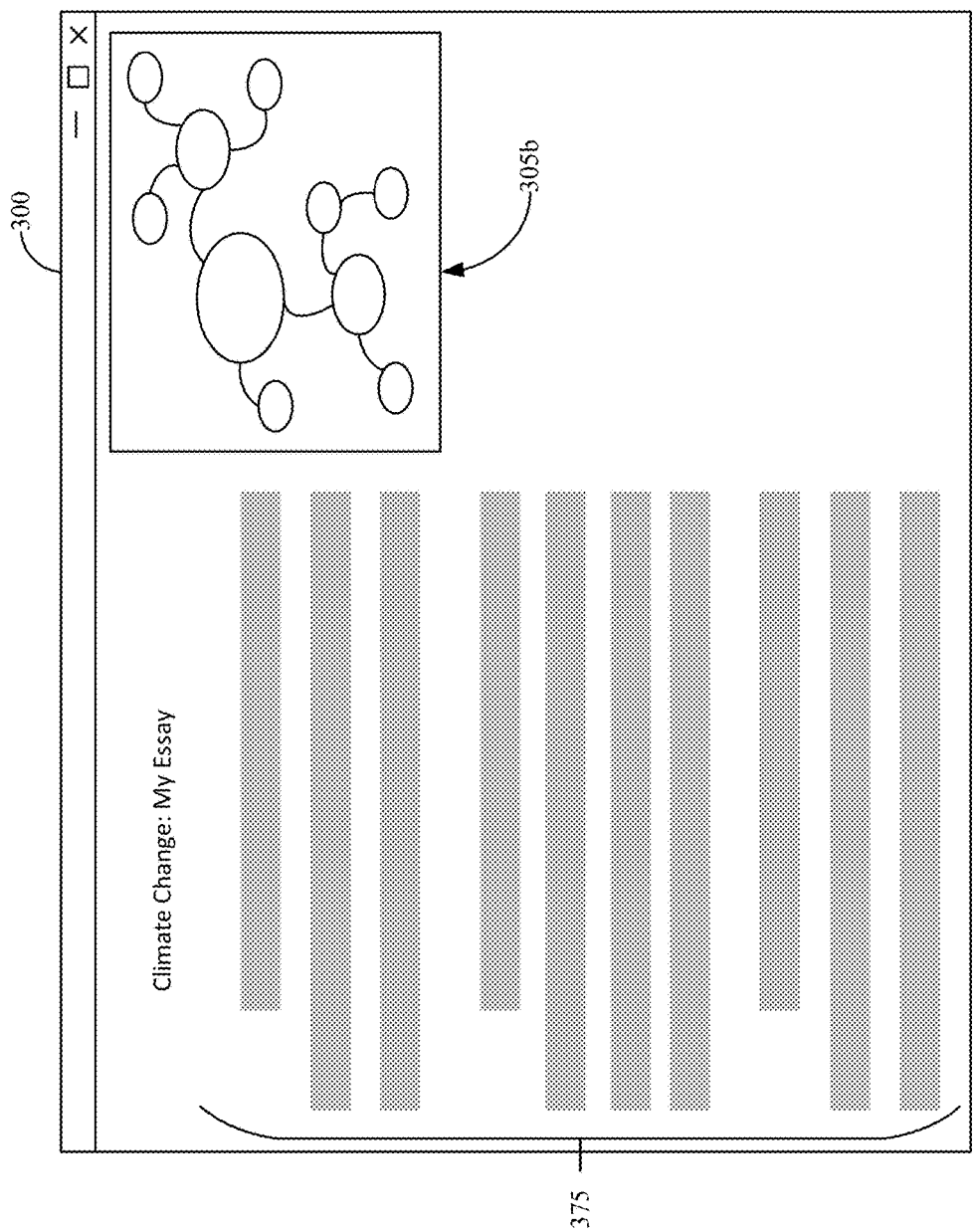

Referring to FIG. 3E, the user can create a document and display the topic graph the same UI. This allows the user to write, for example, an essay on climate change 375 while referring to the topic graph 305b generated based on the spoken thoughts of the user discussing climate change, without the need to open a separate application. In some cases, topic graph 305b may be displayed in a separate window from the document, allowing the user to move the topic graph 305b around the UI.

Figure 4:
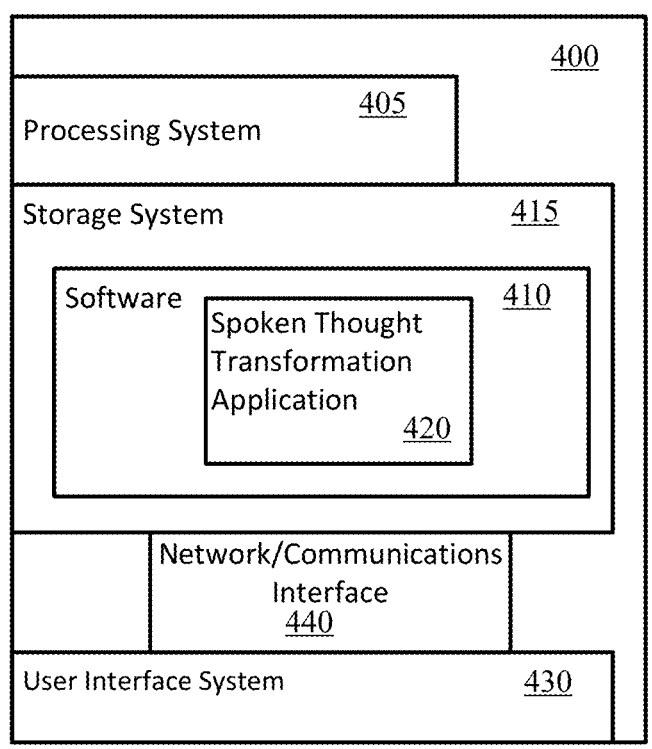
FIG. 4 illustrates components of an example computing system.

FIG. 4 illustrates components of a computing device or system that may be used in certain embodiments described herein. Referring to FIG. 4, system 400 may represent a computing device such as, but not limited to, a personal computer, a reader, a mobile device, a personal digital assistant, a wearable computer, a smart phone, a tablet, a laptop computer (notebook or netbook), a gaming device or console, an entertainment device, a hybrid computer, a desktop computer, an interactive whiteboard, or a smart television. Accordingly, more or fewer elements described with respect to system 400 may be incorporated to implement a particular computing device.

System 400 includes a processing system 405 of one or more processors to transform or manipulate data according to the instructions of software 410 stored on a storage system 415. Examples of hardware processors of the processing system 405 include general purpose central processing units, application specific processors, and logic devices, as well as any other type of processing device, combinations, or variations thereof. The processing system 405 may be, or is included in, a system-on-chip (SoC) along with one or more other components such as network connectivity components, sensors, video display components.

The software 410 can include an operating system and application programs such as a spoken thought transformation application 420. Device operating systems generally control and coordinate the functions of the various components in the computing device, providing an easier way for applications to connect with lower level interfaces like the networking interface. Non-limiting examples of operating systems include Windows® from Microsoft Corp., Apple® iOS™ from Apple, Inc., Android® OS from Google, Inc., and the Ubuntu variety of the Linux OS from Canonical.

It should be noted that the operating system may be implemented both natively on the computing device and on software virtualization layers running atop the native device operating system (OS). Virtualized OS layers, while not depicted in FIG. 4, can be thought of as additional, nested groupings within the operating system space, each containing an OS, application programs, and APIs.

Storage system 415 may comprise any computer readable storage media readable by the processing system 405 and capable of storing software 410 including the spoken thought transformation application 420.

Storage system 415 may include volatile and nonvolatile memory, removable and non-removable media implemented in any method or technology for storage of information, such as computer readable instructions, data structures, program modules, or other data. Examples of storage media of storage system 415 include random access memory, read only memory, magnetic disks, optical disks, CDs, DVDs, flash memory, magnetic cassettes, magnetic tape, magnetic disk storage or other magnetic storage devices, or any other suitable storage media. In no case is the storage medium a transitory propagated signal or carrier wave.

Storage system 415 may be implemented as a single storage device but may also be implemented across multiple storage devices or sub-systems co-located or distributed relative to each other. Storage system 415 may include additional elements, such as a controller, capable of communicating with processing system 405.

In general, software may, when loaded into processing system 405 and executed, transform computing system 400 overall from a general-purpose computing system into a special-purpose computing system customized to retrieve and process the information for facilitating spoken thought transformation as described herein for each implementation. Indeed, encoding software on storage system 415 may transform the physical structure of storage system 415. The specific transformation of the physical structure may depend on various factors in different implementations of this description. Examples of such factors may include, but are not limited to the technology used to implement the storage media of storage system 415 and whether the computer-storage media are characterized as primary or secondary storage.

The system can further include a user interface system 430, which may include input/output (I/O) devices and components that enable communication between a user and the system 400. User interface system 430 can include input devices such as a mouse, track pad, keyboard, a touch device for receiving a touch gesture from a user, a motion input device for detecting non-touch gestures and other motions by a user, a microphone for receiving speech, and other types of input devices and their associated processing elements capable of receiving user input.

The user interface system 440 may also include output devices such as display screen(s), speakers, haptic devices for tactile feedback, and other types of output devices. In certain cases, the input and output devices may be combined in a single device, such as a touchscreen display which both depicts images and receives touch gesture input from the user. A touchscreen (which may be associated with or form part of the display) is an input device configured to detect the presence and location of a touch. The touchscreen may be a resistive touchscreen, a capacitive touchscreen, a surface acoustic wave touchscreen, an infrared touchscreen, an optical imaging touchscreen, a dispersive signal touchscreen, an acoustic pulse recognition touchscreen, or may utilize any other touchscreen technology. In some embodiments, the touchscreen is incorporated on top of a display as a transparent layer to enable a user to use one or more touches to interact with objects or other information presented on the display.

Visual output may be depicted on the display in myriad ways, presenting graphical user interface elements, text, images, video, notifications, virtual buttons, virtual keyboards, or any other type of information capable of being depicted in visual form.

The user interface system 430 may also include user interface software and associated software (e.g., for graphics chips and input devices) executed by the OS in support of the various user input and output devices. The associated software assists the OS in communicating user interface hardware events to application programs using defined mechanisms. The user interface system 430 including user interface software may support a graphical user interface, a natural user interface, or any other type of user interface. For example, the interfaces for the visual display of a topic graph described herein may be presented through user interface system 430.

Communications interface 440 may include communications connections and devices that allow for communication with other computing systems over one or more communication networks (not shown). Examples of connections and devices that together allow for inter-system communication may include network interface cards, antennas, power amplifiers, RF circuitry, transceivers, and other communication circuitry. The connections and devices may communicate over communication media (such as metal, glass, air, or any other suitable communication media) to exchange communications with other computing systems or networks of systems. Transmissions to and from the communications interface are controlled by the OS, which informs applications of communications events when necessary.

It should be understood that the examples and embodiments described herein are for illustrative purposes only and that various modifications or changes in light thereof will be suggested to persons skilled in the art and are to be included within the spirit and purview of this application.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims subject to any explicit definitions and disclaimers regarding terminology as provided above.

What is claimed is:

1. A method of transforming spoken thoughts to a visual representation of related topics found in the spoken thoughts, comprising:
   receiving, at a computing device, audio input of a spoken thought of a user;
   transforming the spoken thought into a topic graph representing topics of the spoken thought and relationships between the topics by:
      converting the audio input to text of the spoken thought;
      identifying a plurality of topics from the text using word frequency;
      creating, at the computing device, the topic graph for the plurality of topics by determining relationships between topics of the plurality of topics, and assigning a weight to each of the plurality of topics based at least on the determined relationships; and
      updating the plurality of topics and the topic graph as the audio input is received;
   generating, at the computing device, a visual display of the topic graph for the plurality of topics by:
      assigning a topic shape and a size for each of the plurality of topics based on the assigned weight; and
      displaying relevant ones of the plurality of topics with the assigned topic shape and size and connected by the determined relationships within a graphical user interface of a content creation application, wherein the visual display of the topic graph dynamically changes and grows as the audio input is received and the plurality of topics and the topic graph are updated,
      whereby the visual display of the topic graph is the transformation of the spoken thought to the visual representation of the related topics found in the spoken thought;
   assigning an outline parameter to each of the plurality of topics based on the size of corresponding topic shapes and the determined relationships;
   generating an outline based on the outline parameters, wherein the outline parameters comprise headings and subheadings; and
   displaying the outline within the graphical user interface of the content creation application.

2. The method of claim 1, wherein identifying the plurality of topics further comprises:

defining a rating system for words included in the text; and forming clusters of words using the word frequency and an assigned rating, wherein the clusters of words define subject areas.

3. The method of claim 1, wherein determining relationships between topics of the plurality of topics comprises:

grouping the text into groupings of text associated with each of the plurality of topics; and determining relationships between each of the groupings of text.

4. The method of claim 1, wherein assigning the weight to each of the plurality of topics and entities based on at least the determined relationships comprises:

grouping the text into a grouping of text for each of the plurality of topics;

calculating a percentage of total text for each grouping of text; and assigning a weight to each grouping of text based on the percentage of total text for the grouping of text.

5. The method of claim 1, wherein assigning the weight to each of the plurality of topics based at least on the determined relationships comprises determining a hierarchy of the plurality of topics.

6. The method of claim 1, further comprising assigning a largest sized topic as a main topic.

7. The method of claim 1, wherein the topic shapes are one or more of a bubble, a circle, a square, and a rectangle.

8. A system for transforming spoken thoughts, comprising:

a user input interface;

a processing system;

one or more storage media;

an application stored on at least one of the one or more storage media that, when executed by the processing system, direct the processing system to:

receive, at a computing device, audio input of a spoken thought of a user;

transform the spoken thought into a topic graph representing topics of the spoken thought and relationships between the topics by:

converting the audio input to text of the spoken thought;

identifying a plurality of topics from the text using word frequency;

creating, at the computing device, the topic graph for the plurality of topics by determining relationships between topics of the plurality of topics, and assigning a weight to each of the plurality of topics based at least on the determined relationships; and updating the plurality of topics and the topic graph as the audio input is received;

generate, at the computing device, a visual display of the topic graph for the plurality of topics by:

assigning a topic shape and a size for each of the plurality of topics based on the assigned weight; and displaying relevant ones of the plurality of topics with the assigned topic shape and size and connected by the determined relationships within a graphical user interface of a content creation application, wherein the visual display of the topic graph dynamically changes and grows as the audio input is received and the plurality of topics and the topic graph are updated, whereby the visual display of the topic graph is the transformation of the spoken thought to the visual representation of the related topics found in the spoken thought;

assign an outline parameter to each of the plurality of topics based on the size of corresponding topic shapes and the determined relationships;

generate an outline based on the outline parameters, wherein the outline parameters comprise headings and subheadings; and display the outline within the graphical user interface of the content creation application.

9. The system of claim 8, wherein identify the plurality of topics further comprises:

define a rating system for words included in the text; and form clusters of words using the word frequency and an assigned rating, wherein the clusters of words define subject areas.

10. The system of claim 8, wherein assign the weight to each of the plurality of topics based at least on the determined relationships comprises:

group the text into groupings of text associated with each of the plurality of topics; and determine relationships between each of the groupings of text.

11. The system of claim 8, wherein assign the weight to each of the plurality of topics based at least on the determined relationships comprises determine a hierarchy of the plurality of topics.

12. The system of claim 8, wherein the application further directs the processing system to assign a largest sized topic as a main topic.

13. One or more computer readable storage media having instructions stored thereon that when executed by a processing system direct the processing system to at least:

receive, at a computing device, audio input of a spoken thought of a user;

transform the spoken thought into a topic graph representing topics of the spoken thought and relationships between the topics by:

converting the audio input to text of the spoken thought;

identifying a plurality of topics from the text using word frequency;

creating, at the computing device, the topic graph for the plurality of topics by determining relationships between topics of the plurality of topics, and assigning a weight to each of the plurality of topics based at least on the determined relationships; and updating the plurality of topics and the topic graph as the audio input is received;

generate, at the computing device, a visual display of the topic graph for the plurality of topics by:

assigning a topic shape and a size for each of the plurality of topics based on the assigned weight; and displaying relevant ones of the plurality of topics with the assigned topic shape and size and connected by the determined relationships within a graphical user interface of a content creation application, wherein the visual display of the topic graph dynamically changes and grows as the audio input is received and the plurality of topics and the topic graph are updated, whereby the visual display of the topic graph is the transformation of the spoken thought to the visual representation of the related topics found in the spoken thought;

assign an outline parameter to each of the plurality of topics based on the size of corresponding topic shapes and the determined relationships;

generate an outline based on the outline parameters, wherein the outline parameters comprise headings and subheadings; and display the outline within the graphical user interface of the content creation application.

14. The media of claim 13, wherein identify the plurality of topics further comprises:

define a rating system for words included in the text; and form clusters of words using the word frequency and an assigned rating, wherein the clusters of words define subject areas.

15. The media of claim 13, wherein assign the weight to each of the plurality of topics based at least on the determined relationships comprises:

group the text into groupings of text associated with each of the plurality of topics; and determine relationships between each of the groupings of text.

16. The media of claim 13, wherein the instructions further direct the processing system to at least assign a largest sized topic as a main topic.

17. The media of claim 13, wherein the instructions further direct the processing system to at least:

group the text into groupings of text for each of the plurality of topics;

calculate a percentage of total text for each grouping of text; and assign a weight to each grouping of text based on the percentage of total text for the grouping of text.

18. The method of claim 1, wherein the visual display comprises topic shapes and connector lines indicating the determined relationships between topics, wherein assigning an outline parameter to each of the plurality of topics based on the size of the corresponding topic shapes and the determined relationships comprises:

for topics with highest assigned weights, assigning a heading parameter; and for topics connected to the topics with the highest assigned weights by connector lines, assigning a sub-heading outline parameter.

19. The method of claim 1, wherein the visual display of the topic graph is displayed within a separate window from the outline, the separate window being within the graphical user interface of the content creation application and allowing the topic graph to be moved around.

* * * * *